United States Patent
Bradley

(10) Patent No.: US 9,615,117 B2
(45) Date of Patent: Apr. 4, 2017

(54) CONTENT RECORDING AND STORAGE ALLOCATION

(71) Applicant: Comcast Cable Communications, LLC, Philadelphia, PA (US)

(72) Inventor: Bruce R Bradley, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/029,186

(22) Filed: Sep. 17, 2013

(65) Prior Publication Data
US 2015/0082328 A1    Mar. 19, 2015

(51) Int. Cl.
*H04N 21/2543* (2011.01)
*H04N 21/2747* (2011.01)
*H04N 21/8355* (2011.01)

(52) U.S. Cl.
CPC ..... *H04N 21/2543* (2013.01); *H04N 21/2747* (2013.01); *H04N 21/8355* (2013.01)

(58) Field of Classification Search
CPC ........... H04N 21/2543; H04N 21/2747; H04N 21/8355
See application file for complete search history.

(56) References Cited

U.S. PATENT DOCUMENTS

| | | | |
|---|---|---|---|
| 6,782,550 B1 * | 8/2004 | Cao | H04N 5/44543 348/E5.105 |
| 7,526,787 B1 * | 4/2009 | Williamson | H04N 5/76 386/291 |
| 2006/0112415 A1 * | 5/2006 | Choi | H04N 21/41407 725/139 |
| 2007/0098165 A1 * | 5/2007 | Yoshikawa | 380/211 |
| 2007/0157253 A1 * | 7/2007 | Ellis et al. | 725/61 |
| 2008/0069514 A1 * | 3/2008 | Son | H04N 5/775 386/291 |
| 2009/0096876 A1 * | 4/2009 | Herberger | G11B 27/034 348/207.1 |
| 2010/0281496 A1 * | 11/2010 | Carew | 725/5 |
| 2010/0287348 A1 * | 11/2010 | Sampathkumar | G06F 11/1458 711/162 |
| 2012/0284736 A1 * | 11/2012 | Friedman | H04H 20/22 725/14 |
| 2012/0289147 A1 * | 11/2012 | Raleigh et al. | 455/3.06 |
| 2013/0051764 A1 * | 2/2013 | Casagrande | G11B 27/105 386/244 |
| 2014/0304376 A1 * | 10/2014 | Branam | G06F 17/30038 709/219 |

* cited by examiner

*Primary Examiner* — Pinkal R Chokshi
(74) *Attorney, Agent, or Firm* — Ballard Spahr LLP

(57) ABSTRACT

Methods and systems for providing content are disclosed. An example method can comprise providing content based on a subscription agreement or other arrangement. An example method can comprise identifying a portion of the content relevant to a user and providing an offer to the user to record the portion of the content. The offer can comprise an offer price and an access condition. An example method can comprise allocating storage and recording the portion of the content. Further, access to the stored portion of the content can be provided in accordance with the access condition.

19 Claims, 5 Drawing Sheets

CONTENT RECORDING AND STORAGE ALLOCATION

BACKGROUND

Time-shifted and live content can be recorded and stored for later viewing. Equipment for time-shifting can be expensive but may provide large amounts of recording space capable of storing many hours of recordings. However, some users may desire varying amounts of recording space for occasional recording of content. Thus, there is a need for more sophisticated methods and systems for recording and providing content.

SUMMARY

It is to be understood that both the following general description and the following detailed description are exemplary and explanatory only and are not restrictive, as claimed. Disclosed are methods and systems for providing content. An example method can comprise providing content (e.g., streaming, file transfer, and the like) based on a subscription or use agreement. A portion of the content relevant to a user can be identified. An offer to record and/or store the portion of the content can be provided to the user. In one aspect, the offer can comprise an offer price and an access condition. Storage for recording the portion of the content can be allocated. For example, the storage for recording the portion of the content can be allocated in response to an acceptance of the offer or before the offer is accepted. The portion of the content can be recorded and/or stored in the allocated storage. Access to the recorded and/or stored portion of the content can be provided in accordance with the access condition (e.g., until the access condition expires). For example, the access condition can specify that a user can access a particular recorded content for a specified time period (e.g., hours, days, months, years, unlimited) and/or for a specified number of views (e.g., 1, 2, 5, 10, 15, unlimited). The access conditions can limit the user to access the recorded content from a specified device, in a specified resolution (e.g. 480p, 780p, 1080p), in a specified geographic region, during a specified time of day, and/or the like.

In another aspect, an example method can comprise receiving content based on a subscription or usage agreement and receiving an offer to record and/or store a portion of the content relevant to a user. The offer can comprise an offer price and an access condition. An acceptance of the offer can be provided and can comprise a payment of the offer price. An allocation of storage comprising a recorded and/or stored portion of the content can be received. For example, the allocation of storage can be associated with a device and/or user. Access to the recorded and/or stored portion of the content can be received in accordance with the access condition (e.g., until the access condition expires).

In another aspect, an example method can comprise identifying a portion of content (e.g., content stream) relevant to a user. The user can receive access to the content based on a subscription or usage agreement. An offer to record and/or store the portion of the content can be provided to the user. In an aspect, the offer can comprise an offer price and an access condition. The portion of the content can be recorded and/or stored in a storage allocation. The storage allocation can comprise a storage space associated with the user. The storage allocation can be limited to store the recorded and/or stored portion of the content. Access to the recorded and/or stored portion of the content can be provided in accordance with the access condition (e.g., until the access condition expires).

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
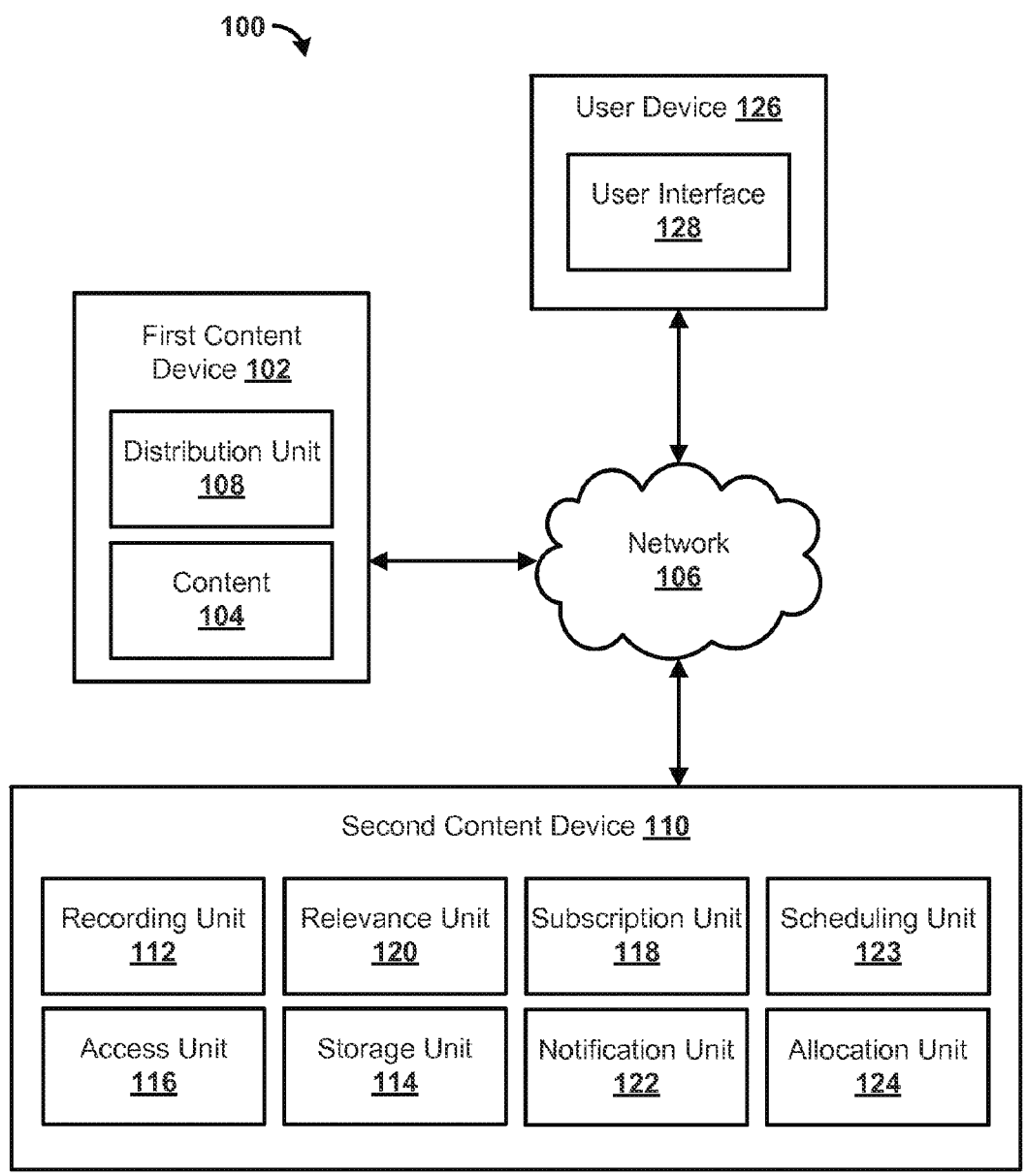
FIG. 1 illustrates various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for providing content. Specifically, the present disclosure relates to offering users (e.g., customers, subscribers) the ability to record content, (e.g., a single episode or series of episodes on an à la carte basis (e.g., offering recorded content by the item rather than based on a monthly subscription fee)). The offer can be provided to the customer based on one or more factors, including but not limited to, a predicted relevancy, an instruction from the user (e.g., via a remote button or an interface element, such as an icon, in a user interface), or the like. As an example, relevancy can be predicted based on user history (e.g., channel viewing, recording), user profile information, aggregated information (e.g. viewership, recording schedule) from a plurality of users, and/or the like. For example, a user interface can be provided to a user that indicates an offer to record a portion of content (e.g., a content item, such as episodes of a show, events, movies) for an offer price (e.g., fee, such as 0.99, 1, 2, 5 US dollars). The offer can also comprise an access condition, which defines limits for a user in accessing the recorded portion of the content based on one or more conditions (e.g., expiration date, number of views, number of downloads). A user can select a user interface element (e.g., input element, such as a button) on the user interface (e.g., web browser, program guide, email program) indicating the user's acceptance of the offer. If the user accepts the offer, the selected portion of the content can be recorded on behalf of the user at the scheduled time.

In an aspect, storage can be allocated for the recording. The allocated storage can be part of a network digital video recorder system, a set top box hard drive, a set top flash memory, or the like. The user can request additional recordings, but an individual fee can be assessed for each recording. For each additional recording, additional storage space can be allocated to record and store the recording. The recording can be temporary. For example, after a period of time (e.g., end of season of a show) the recording can be eliminated (e.g., deleted) based on the access condition. The recording can be accessible through an onscreen guide (e.g., video on demand menu, web browser interface, or other application interface). Once a user has recorded multiple portions of content (e.g., content items) using this service, the user can be offered an upgraded digital video recording service. If the upgrade is accepted, the user can be allocated an amount of storage that can be used for recording various and multiple portions of content (e.g., content items). For this upgraded service, in some aspects, the user can be charged a flat monthly fee rather than be charged by the recording. The user's prior recordings can continue to be accessible as part of this upgraded digital video recording service.

FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more first content device, second content device, and/or user device. For example, the present systems and methods can be implemented in a recording unit, storage unit, relevance unit, subscription unit, notification unit, scheduling unit, access unit, and/or allocation unit. As described in more detail herein, the relevance unit can identify portions of content relevant to users, the notification unit can provide offers to users to record portions of content, the allocation unit can allocate storage space for recording the portion of the content, the recording unit can record the portions of content, and the access unit can implement access conditions associated with the recorded content.

In one aspect, the system 100 can comprise a first content device 102 configured to provide content 104 through a network 106. The first content device 102 can comprise one or more computing devices, such as a server or other network device. For example, the first content device 102 can comprise a distribution unit 108. The distribution unit 108 can prepare and/or provide the content 104 for transmission through the network 106. As an example, the distribution unit 108 can comprise one or more encoders, multiplexers, servers, transceivers, and the like. The content 104 can comprise video, audio, images, text, computer readable code, signaling (e.g., metadata), and the like. In one aspect, the content 104 can comprise a plurality of content channels (e.g., content streams). The distribution unit 108 can distribute the content 104 as a plurality of content channels. For example, the distribution unit 108 can provide a specific content channel on a specific frequency and/or at a specific network location (e.g., uniform resource identifier, such as a uniform resource locator). The content 104 can be streamed from the first content device 102. The content 104 can be distributed as live or time shifted, e.g., recorded.

In one aspect, the network 106 can comprise a packet switched network (e.g., internet protocol based network), a non-packet switched network (e.g., quadrature amplitude modulation based network), and/or the like. The network 106 can comprise network adapters, switches, routers, and the like connected through wireless links (e.g., radio frequency, satellite) and/or physical links (e.g., fiber optic cable, coaxial cable, Ethernet cable). In one aspect, the network 106 can be configured to provide communication from telephone, cellular, modem, and/or other electronic devices to and throughout the system 100.

In one aspect, the system 100 can comprise a second content device 110. The second content device 110 can comprise one or more computing devices, such as a server or other network device. Components of the second content device 110 can be distributed among various locations in a network (e.g., network 106). The second content device 110 can be configured to manage one or more content recordings. For example, the second content device 110 can comprise a recording unit 112 configured to record content. The recording unit 112 can receive content 104 from the first content device 102 and/or other content source. The content 104 can be received as a stream of content, such as a video stream, audio stream, metadata or data associated with the stream, and/or the like. The recording unit 112 can record a portion (or all) of the content. For example, the recording unit 112 can record all or part of a show, program, event, movie, and/or the like. In one aspect, the recording unit 112 can record multiple copies of the same content at various bit rates. For example, the distribution unit 108 can provide several content streams at different bit rates for one content channel. The recording unit 112 can select one or more of these content streams for recording a particular content item (e.g., show, program, event, movie).

The second content device 110 can comprise a storage unit 114 configured to store the recorded content. For example, the storage unit 114 can store a recorded portion of content. As a further example, the recording unit 112 can record directly to the storage unit 114. As another example, the recording unit 112 can record to a temporary buffer and subsequently move the recording to the storage unit 114. In one aspect, the storage unit 114 can associate one or more identifiers with the recorded content. For example, the recorded content can be associated with a recording identifier identifying the recording, a user identifier identifying a user requesting the recording, a content identifier identifying a content item recorded, and/or other similar identifiers. As another example, the recorded content can be associated with a hash identifier, such as an identifier based on a message-digest algorithm (e.g., MD4, MD5. MD6), secure hash algorithm (e.g., SHA-1, SHA-2, SHA-3), or other algorithm. In one aspect, the storage unit 114 can be distributed across multiple devices.

In one aspect, the second content device 110 can comprise an access unit 116. The access unit 116 can be configured to manage access to the recorded content stored in the storage unit 114. For example, the access unit 116 can evaluate requests for the recorded content. The access unit 116 can be configured to evaluate the requests based on the rights of the requesting device and/or requesting user. For example, the access unit 116 can comprise a list (e.g., table, database, text file, or the like) of rights associated with users, devices, content, and/or the like. The list of rights can comprise users associated with one or more access conditions. For example, the access conditions can specify that a user can access a particular recorded content for a specified time period (e.g., hours, days, months, years, unlimited) and/or for a specified number of views (e.g., 1, 2, 5, 10, 15, unlimited). The access conditions can limit the user to access the recorded content from a specified device, in a specified resolution (e.g., 480p, 780p, 1080p), in a specified geographic region, during a specified time of day, and/or the like. The access conditions can limit the user's ability to fast forward and/or rewind content. The access conditions can limit the user's ability to copy the content.

In one aspect, the access unit 116 can be configured to provide or limit access to the recorded and/or stored content based on a variety of distribution methods. For example, the access unit 116 can limit access of the recorded and/or stored content to streaming and/or download. In one aspect, the access unit 116 can track the number of times the recorded and/or stored content is downloaded or accessed by the user. For example, the access unit 116 can limit the number of downloads of the recorded content. The access unit 116 can also limit access to the recorded content based on geographic location. For example, the access unit 16 can limit streaming and/or downloading of the content based on any conditions associated with the content (e.g., such as access conditions or conditions in a distribution agreement). In another aspect, the access unit 116 can limit access to the recorded and/or stored content based on the type of device requesting the recorded and/or stored content. For example, access unit 116 can allow access or prevent access if the requesting device is a set top box, mobile device, tablet device, laptop, computer workstation, and/or the like.

In one aspect, the second content device 110 can comprise a subscription unit 118. The subscription unit 118 can be configured to manage user rights to one or more content subscription plans. For example, a content subscription plan can comprise rights associated with various content items and/or content streams (e.g., content channels). For example, a content subscription plan can provide a user the right to view content on a particular selection of channels. The content subscription plan can be contingent on one or more payments, such as a monthly payment. Content subscription plans that provide rights to more content, higher quality content, and/or more services associated the content can be contingent on a larger payment than a content subscription plan that provides less content, lower quality content, and/or fewer services associated with the content.

In one aspect, the second content device 110 can comprise a relevance unit 120. The relevance unit 120 can be configured to identify a portion of the content relevant to a user. For example, the relevance unit 120 can be configured to identify a content item, such as an episode of a program, a live event (e.g., political event, parade), a sports event, a show, a movie, and the like. In one aspect, the relevance unit 120 can be configured to identify the portion of the content as relevant to a user based on a viewing history, user preferences, user location, and the like. For example, if a user has viewed X number (e.g., 1, 2, 5, 10) of episodes of a program, the relevance unit 120 can identify a future episode of the show as relevant to the user. As another example, if the user has a user preference indicating a favorite sports team, the relevance unit 120 can identify a future game of the sports team. In another aspect, the relevance unit 120 can be configured to identify the portion of the content as relevant to the user based on user input. For example, the relevance unit 120 can receive one or more instructions from a user indicating that the portion of the content is relevant. For example, the instruction can comprise information that a user has liked, bookmarked, added as a favorite, or otherwise indicated a preference for particular content item and/or types of content. As another example, the instruction can comprise an acceptance of an offer to record the content as described herein.

In one aspect, the relevance unit 120 can be configured to identify the portion of the content based on a content subscription plan associated with the user. For example, the relevance unit 120 can query the subscription unit 118 to determine what content items, content streams, and/or content channels a user has rights to access. If the user has rights to access the portion of the content, the relevance unit 120 can identify the portion of the content as relevant. In another aspect, the relevance unit 120 can identify the portion of the content as relevant even if the user does not have rights to the content. For example, the subscription unit 118 can store information about distribution agreements from the provider of the content and/or portion of the content. Distribution agreements can allow portions of content to be recorded based on specified conditions, such as additional payment by the user. For example, the distribution agreement can specify that a user must subscribe to a content channel for a specified time period (e.g., hour, day, month, year) or pay a one-time fee for the right to access the content for recording. If the distribution agreement allows portions of content to be recorded, then the relevance unit 120 can identify the portion of the content as relevant.

In one aspect, the relevance unit 120 can be configured to identify portions of the content based on aggregated viewership and/or recording information. For example, if a specified number of users have scheduled to record a portion of the content, then the relevance unit 120 can identify the portion of the content as relevant to other users. As a further example, the relevance unit 120 can identify the portion of the content as relevant based on users having similar demographics (e.g., age, viewing history, geographic location, content subscription, and the like). For example, a portion of content relevant to one user can also be relevant to a user with similar demographics. As a further example, if X number of viewers have scheduled to record the portion of the content in a given geographic location and the user is located within the geographic location, then the relevance unit 120 can identify the portion of the content as relevant to the user. In another aspect, a portion of content can be identified as relevant based on generally accepted importance and/or viewership history. For example, major political and sports events, such as presidential inaugurations, world and/or national sporting championships, and the like can be identified as relevant to users.

In one aspect, the relevance unit 120 can be configured to identify portions of the content based on electronic program guide data. In one aspect, the electronic program guide data can comprise a list of content (e.g., shows, programs, events, movies, and the like). The electronic program guide data can comprise a schedule of times when the content items will be provided in a content stream (e.g., content channel). The electronic program data can comprise metadata associated with the content items, such as actors, actresses, genre, show identifier, episode identifier, content category, geographic region, and the like. In one aspect, the relevance unit 120 can access the electronic program guide data and identify one or more content items relevant to a user. For example, the relevance unit 120 can identify metadata that matches user preferences, user demographics, user viewing history, user interests, and/or the like.

In one aspect, the second content device 110 can comprise a notification unit 122. The notification unit 122 can be configured to generate and provide one or more notifications to users. In one aspect, a notification can comprise an offer to a user to record and/or store a portion of content (e.g., the portion identified as relevant to the user). In one aspect, the offer can comprise an offer price. The notification unit 122 can be configured to determine the offer price based on a price schedule. For example, the price schedule can associate specific content items with various prices, tiers of pricing, and the like. As a further example, the prices can be based on the content resolution (e.g. standard definition, high definition), the length of the content, the channel on which the content is provided, a length of time access is provided to the recording, user subscription plans, and/or the like. In one aspect, the offer price can comprise a price to record and/or a price to access content. For example, the recording unit 112 can be configured to record a portion of the content at the request of the user for free, but the user can be required to pay the offer price to access the recorded portion of the content. As another example, the recording unit 112 can be configured to record a portion of the content at the request of the user in exchange for the offer price, and the user can be provided access to the recorded portion of the content.

In one aspect, the offer can be based on an association of an advertisement with the portion of the content. For example, the offer can be conditioned upon the user accessing, viewing, selecting, providing information, and/or otherwise interacting with an advertisement. As another example, the offer price can comprise an agreement to or the performance of accessing, viewing, selecting, providing information, and/or otherwise interacting with an advertisement.

In one aspect, an offer can also comprise an access condition. The access condition can comprise a time period of access to the portion of the content recorded in the allocated storage. As a further example, the access condition can comprise an expiration date, time range (e.g., X number of hours, days), a number of times the portion of the content can be accessed, and the like. As an illustration, an access condition can specify that a recorded portion of content can be accessed for a month (e.g., from the time of recording). Accordingly, the access unit 116 can be configured to evaluate the access condition upon request of the recorded portion of the content. For example, if more than a month of time has passed (e.g., since the portion of content was recorded), the access unit 116 can deny requests for the recorded portion of the content. As another example, the access unit 116 can deny a user whose account has been flagged based on billing issues (e.g., failure to pay bills, account on credit hold).

In another aspect, the access condition can be based on an advertisement. For example, the access condition can be contingent upon or comprise a condition that the advertisement be accessed, viewed, selected, provided information, or otherwise interacted with during a time period (e.g., during access to the portion of the content, during a commercial break to the portion of the content, before recording the portion of the content).

In one aspect, the notification unit 122 can be configured to provide a notification indicating the status of a recording of a portion of content. For example, the notification unit 122 can provide a notification indicating that a recording is beginning, the percentage complete of a recording, and/or that a recording has completed. As another example, the notification unit 122 can provide a notification indicating that a recorded portion of content is ready for viewing and/or accessing by a user. The notification can comprise a link to view and/or access the recording.

In one aspect, the notification unit 122 can be configured to provide an offer to upgrade to a subscription based digital video recording (DVR) service. For example, the subscription based DVR service can provide a specified amount of storage space (e.g., 100 gigabytes, 200 gigabytes, 500 gigabytes, 1 terabyte). The specified amount of storage space can be used for recording a variety of content items from content. In one aspect, under the subscription based DVR service users can be permitted to reuse the storage space by deleting portions of content and recording other portions of content in the specified amount of storage space. Under the subscription based DVR service, users can pay a subscription fee such as a monthly fee or other recurring fee to maintain the access to the subscription. The subscription fee can be larger than the offer price for recording individual content items described herein. For example, the subscription price can be 5, 10, 15, or 20 times (e.g., or other number) larger than the offer price. In one aspect, the notification unit 122 can be configured to offer the subscription based DVR service to a user whose monthly costs in individually purchased recordings reach a threshold value (e.g., such as the cost of the subscription service).

In one aspect, the second content device 110 can comprise a scheduling unit 123. The scheduling unit 123 can be configured to receive and process an acceptance of an offer to record a portion of content. For example, the scheduling unit 123 can evaluate if the user accepting the offer is entitled to accept the offer. For example, the scheduling unit 123 can determine if the user's account is in good standing (e.g., paid up to date). The scheduling unit 123 can determine if the user is still entitled to access the content requested. For example, if a user receives an offer, changes to a lower-tier subscription plan, and accepts the offer, the user will no longer be entitled to record the portion of the content if the content is no longer included in the lower-tier subscription plan. In another aspect, the scheduling unit 123 can verify that the time to record the requested portion of the content has not already passed. For example, if the user accepts the offer to record the portion of the content after the portion of the content is already broadcasted on the content stream, the scheduling unit 123 can reject the user's acceptance of the offer. The scheduling unit 123 can also determine if other specifications are met, such as parental controls, bandwidth requirements, storage requirements, and the like.

If the scheduling unit 123 determines that the user accepting the offer is entitled to the offer, then the scheduling unit 123 can schedule a recording with the recording unit 112. Additionally, the scheduling unit 123 can be configured to process payment information from the user requesting to record a portion of the content. For example, the scheduling unit 123 can be configured to add the offer price to the bill associated with the account. As another example, the scheduling unit 123 can be configured to process additional payment credentials (e.g., credit card, electronic payment service, and the like) to satisfy the offer price.

In one aspect, the second content device 110 can comprise an allocation unit 124. The allocation unit 124 can be configured to allocate storage for recording the portion of the content. The allocated storage can be limited to a storage size based on a size of the portion of the content. The allocation unit 124 can be configured to allocate the storage before and/or after the recording of the portion of the content. In one aspect, the allocation unit 124 can be configured to allocate storage based on an estimated allocation. The estimated allocation can be based on the length of time of the portion of the content, the resolution of the content, and the like. The allocation unit 124 can be configured to allocate and/or reallocate storage after the portion of the content is recorded. For example, the allocation unit 124 can be configured to expand the storage allocation beyond the estimated allocation. For example, content items, such as live content, can have a variable length. Accordingly, the allocation unit 124 can analyze the content to estimate the length by use of image analysis, closed caption text, audio analysis, and/or analysis of other associated data. As an illustration, a sports game can go into overtime, and the allocation unit 124 can perform analysis (e.g., image analysis) of the content to identify the remaining time of the sports game. Accordingly, additional storage space can be allocated based on the identification of the remaining time.

In one aspect, the system 100 can comprise a user device 126. The user device 126 can comprise a computing device, set top box, television, streaming media device, tablet device, mobile device (e.g., smart phone, watch, glasses, or other portable device), laptop, workstation, and the like.

The user device 126 can comprise a user interface 128. In one aspect, the user interface 128 can display one or more interactive elements, such as buttons, input boxes, and the like. The user interface 126 can be configured to receive and display notifications to users. For example, the user interface 126 can receive a notification from the notification unit 122 of the second content device 110. The notification can comprise an offer, such as the offer described herein. For example, the offer can comprise an offer price. The offer can also comprise an access condition. The user interface 126 can be configured to provide the notification to a user through a popup dialog, overlay, email, text, and the like. As another example, the notification can be a symbol, text, or other representation indicating that a portion of the content can be recorded.

The user interface 126 can be configured to allow a user to indicate a preference to record a portion of content. For example, the user interface 126 can receive an indication of a preference to record the content (e.g., through a button on a remote or a button on a user interface). As a further example, the indication of the preference to record a portion of content can be received from the user in response to a notification.

In one aspect, the user interface 126 can be configured to display or otherwise provide content to a user. For example, user device 126 can receive the content 104 from the first content device 102. The user interface 126 can display or otherwise provide the content 104. As another example, the user device 126 can receive (e.g., stream or download) a recorded portion of content from the second content device 110. The user interface 128 can display or otherwise provide the recorded portion of the content to a user. The user interface 126 can be configured to receive advertisements. In one aspect, the user interface 126 can be configured to allow a user to access, view, select, provide information, and/or otherwise interact with an advertisement.

In one aspect, the user device 126 can be configured to perform one or more of the functions of the first content device 102 and/or second content device 110. For example, the user device 126 can comprise and/or implement one or more of the distribution unit 108, content 104, recording unit 112, storage unit 114, access unit 116, subscription unit 118, relevance unit 120, notification unit 122, and allocation unit 124. Additionally, the first content device 102 can implement aspects of the second content device 110. The second content device 110 can implement aspects of the first content device 102. In another aspect, the system 100 can comprise more than one user device 126. For example, notifications from the notification unit 122 can be received at one user device 126, and content and/or recorded content can be accessed from another user device 126. In another aspect, a notification can be received at the same user device 126 at which content 104 and/or recorded content is requested.

Figure 2:
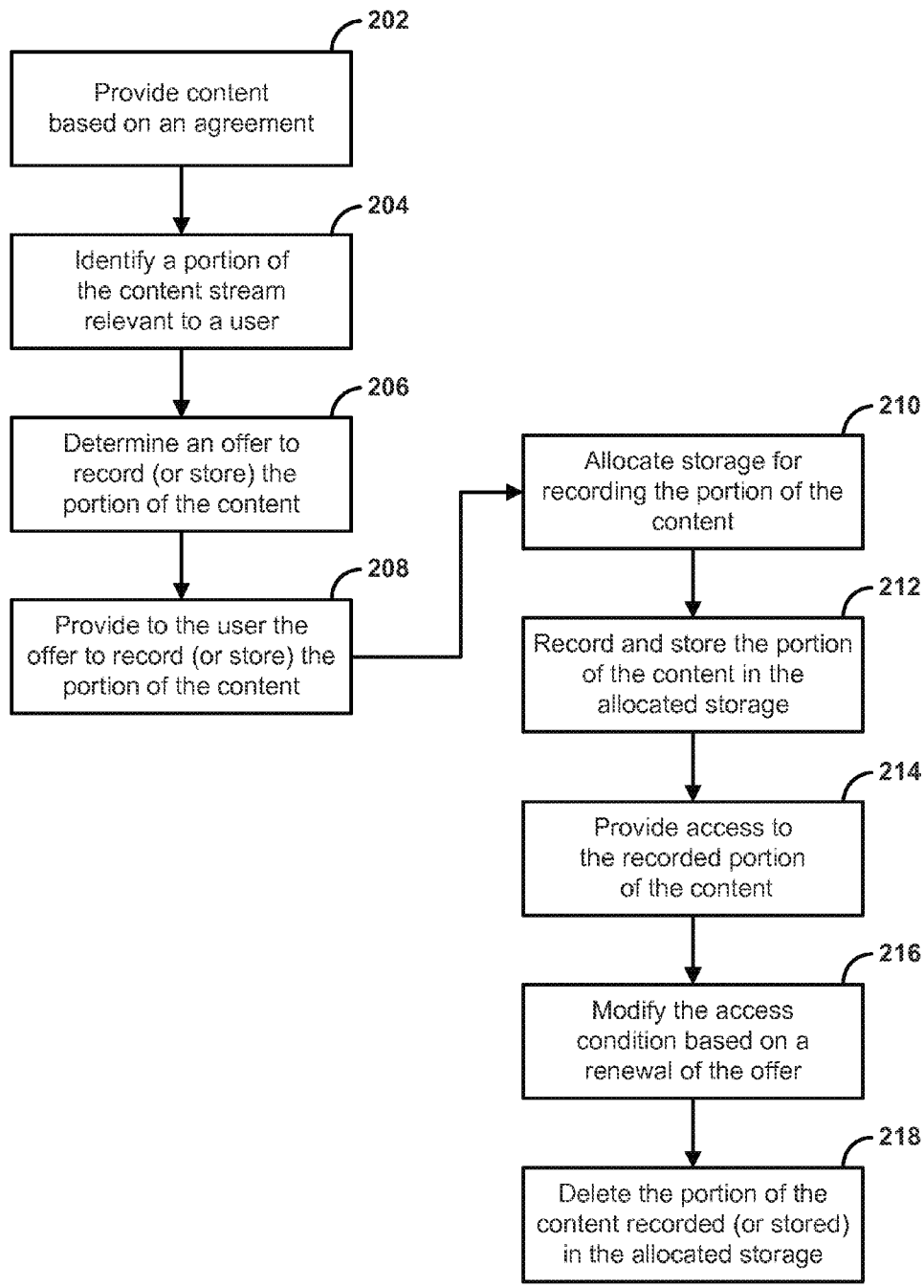
FIG. 2 is a flowchart illustrating an example method for providing content.

FIG. 2 is a flowchart illustrating an example method 200 for providing content. At step 202, content can be provided (e.g., as a stream, a file transfer) to a user based on a subscription or usage agreement or arrangement. The content can comprise media, such as text, images, audio, video and the like. For example, the content can comprise content delivered as a content channel (e.g., from a network location and/or over a frequency range). For example, the subscription agreement can comprise an agreement to provide one or more content items or streams based on any type of commercial agreement, such as a subscription payment, consuming advertisements, participating in focus groups, and the like. The subscription payment can be collected based on a payment schedule (e.g., by the content item, by the byte size, daily, monthly, yearly).

At step 204, a portion of the content relevant to a user can be identified. The portion of the content can comprise a specific content item. For example, the portion of the content can comprise at least one episode of a program, a live event, a show, a sports event, a movie, and the like. The portion of the content can be identified as relevant to a user based on a user request, viewing history, user preferences, user location, and the like. In another aspect, the portion of the content can be identified as relevant to the user based on user input. For example, the user can indicate a preference to record the portion of the content (e.g., through a button on a remote or a button on a user interface). As a further example, the user can indicate a preference to record the portion of the content in response to a notification (e.g., popup or overlay on a user interface, email, text, and the like).

At step 206, an offer to record and/or otherwise store the portion of the content can be determined. In one aspect, the offer can comprise an offer price. For example, the offer price can be determined based on a characteristic of the portion of the content. The offer price can be based on the content resolution (e.g., standard definition, high definition), the length of the portion of the content, the channel on which the portion of the content is provided, a length of time access is provided to the portion of the content, user subscription plans, and the like. The offer price can comprise, for example, a request for a one-time payment. In one aspect, the offer can be based on an association of an advertisement with the portion of the content. For example, the offer can be conditioned upon the user accessing, viewing, selecting, providing information, and/or otherwise interacting with an advertisement. As a further example, the one-time payment can comprise an agreement to or the performance of accessing, viewing, selecting, providing information, and/or otherwise interacting with an advertisement.

In another aspect, the offer can comprise an access condition. In one aspect, the access condition can comprise a time period of access to the portion of the content recorded in the allocated storage. An access condition can be based on how often content is accessed, how many different users are permitted to access content, and/or how many different devices are permitted to access content. As a further example, the access condition can comprise an expiration date, time range (e.g., X number of hours, days), a number of times the portion of the content can be accessed, and the like. In one aspect, the access condition can be based on an advertisement. For example, the access condition can be contingent upon or comprise a condition that the advertisement, or a number of advertisements, be accessed, viewed, selected, provided with additional information, or otherwise interacted with during a time period (e.g., during access to the portion of the content, during a commercial break to the portion of the content, before recording the portion of the content). The access condition can comprise a navigation limitation (e.g., limitation on fast-forwarding, rewinding, skipping, and the like) or a copying limitation (e.g., permission to make additional copies). The access condition can comprise a limitation of access to the stored portion of the content to a specified location (e.g., home, business, state, country, region, city) or specified device (e.g., mobile device, tablet device, television).

At step 208, the offer to record and/or store the portion of the content can be provided to the user. For example, a request can be provided for a one-time payment. The offer can be provided through email, text message, social network message, social network post, an interface displayed with content (e.g., in an overlay, popup box, second screen interface), application notification, and the like.

At step 210, storage for recording the portion of the content can be allocated. In one aspect, the storage can be allocated based on an estimated allocation. The estimated allocation can be based on the length of time of the portion of the content, the resolution of the content, and the like. The storage can be allocated and/or reallocated (e.g., the allocation can be expanded beyond the estimated allocation) after the portion of the content is recorded. For example, the allocated storage can be limited to a storage size based on a size of the portion of the content. In one aspect, the allocated storage can be located in a network device configured to provide the user access to the allocated storage from one or more devices at one or more geographic locations. In another aspect, the allocated storage can be on a device located in a local network of the user such as a gateway, set top box, digital video recorder, and the like.

At step 212, the portion of the content can be recorded in the allocated storage. For example, one or more recording devices can record the portion of the content as one or more content streams at various bit rates. The portion of the content can be recorded in one or more digital formats. In one aspect, the recorded portion of the content can be associated with one or more identifiers configured to identify the recording, content item, content stream, content provider, requesting user, and the like.

At step 214, access to the recorded (e.g., stored) portion of the content can be provided. For example, access to the recorded portion of the content can be provided based on the access condition(s). In one aspect, access to the recorded portion of the content can be provided until the access condition expires. As a further example, when a user requests access to the recorded portion of the content, a determination can be made as to whether the access condition is expired or otherwise fails for the user.

At step 216, the access condition can be modified based on a renewal of the offer. For example, a renewal offer can extend an expiration time, increase the number of times to access the recorded portion of the content, extend a time period, or other similar modification to the access condition. The renewal offer can comprise an offer to permanently store the recorded portion of the content recorded in the allocated storage. In another aspect, a renewal request can be received from the user (e.g., in response to the renewal offer). The renewal request can comprise information indicating a request to extend an expiration time, increase the number of times to access the recorded portion of the content, extend a time period, or other similar modification to the access condition.

At step 218, the portion of the content recorded in the allocated storage can be deleted based on an expiration of the access condition. For example, the portion of the content recorded and/or stored in the allocated storage can be erased or otherwise removed from the allocated storage. As another example, the user's access to the storage allocation can be temporarily or permanently terminated.

Figure 3:
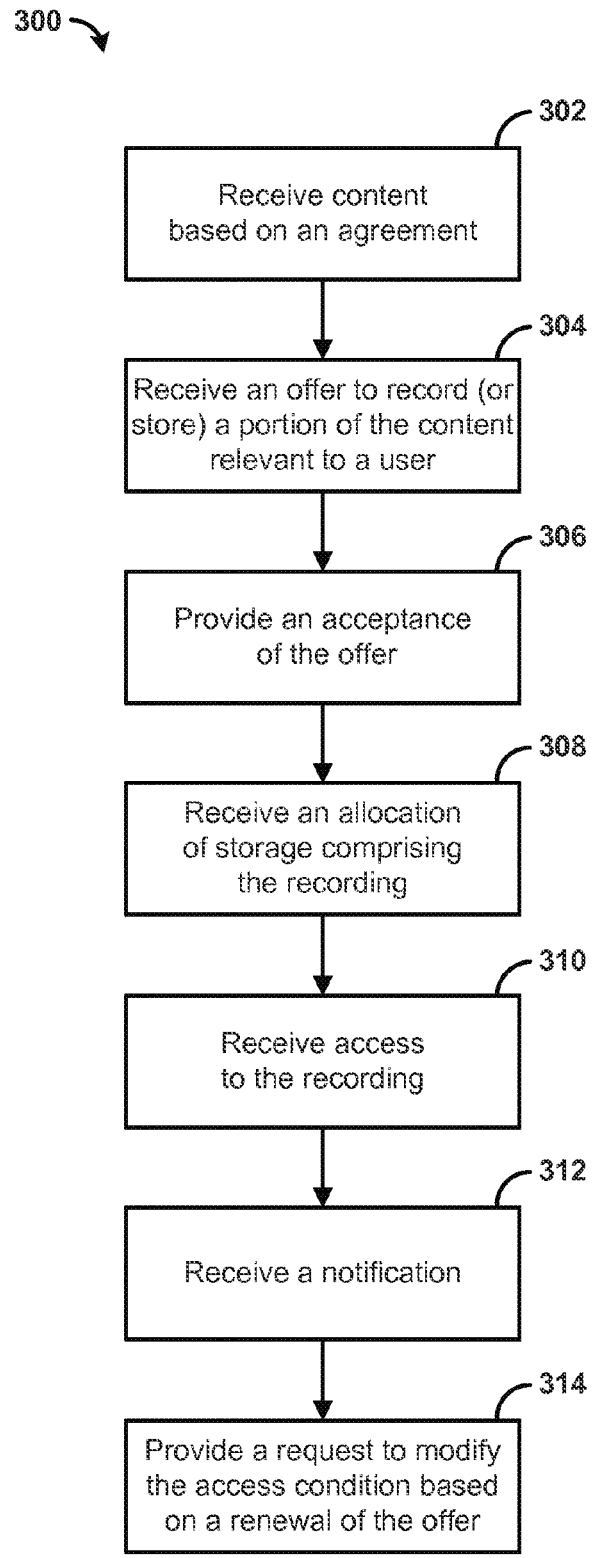
FIG. 3 is a flowchart illustrating another example method for providing content.

FIG. 3 is a flowchart illustrating another example method 300 for providing content. At step 302, content can be received (e.g., as a stream, file transfer) based on a subscription or other type of agreement. The content can comprise media, such as text, images, audio, video and the like. For example, the content can comprise content delivered as a content channel (e.g., from a network location and/or over a frequency range). For example, the subscription agreement can comprise an agreement to provide one or more content streams based on a subscription payment. The subscription payment can be collected based on a payment schedule (e.g., by the content item, by the byte size, daily, monthly, yearly).

At step 304, an offer to record and/or store a portion of the content relevant to a user can be received. The offer to record and/or store the portion of the content can be received through email, text message, social network message, social network post, though an interface displayed with content (e.g. in an overlay, popup box, second screen interface), application notification, and the like. The portion of the content can comprise a specific content item. In one aspect, the portion of the content can comprise at least one episode of a program, a live event, a show, a sports event, a movie, and the like.

In one aspect, the offer can comprise an offer price. The offer price can be based on a characteristic of the portion of the content. For example, the offer price can be based on the content resolution (e.g., standard definition, high definition), the length of the portion of the content, the channel on which the portion of the content is provided, a length of time access is provided to the portion of the content, user subscription plans, and the like. The offer price can comprise, for example, a request for a one-time payment. In one aspect, the offer can be based on an association of an advertisement with the portion of the content. For example, the offer can be conditioned upon the user accessing, viewing, selecting, providing information (e.g., users statistics, such as demographic information), and/or otherwise interacting with an advertisement. As a further example, the one-time payment can comprise an agreement to or the performance of accessing, viewing, selecting, providing information, and/or otherwise interacting with an advertisement.

In another aspect, the offer can comprise an access condition. In one aspect, the access condition can comprise a time period of access to the recording of the portion of the content in the allocation of storage. As a further example, the access condition can comprise an expiration date, time range (e.g., X number of hours, days), a number of times the portion of the content can be accessed, and the like. In one aspect, the access condition can be based on an advertisement. For example, the access condition can be contingent upon or comprise a condition that the advertisement be accessed, viewed, selected, provided information, or otherwise interacted with during a time period (e.g., during access to the portion of the content, during a commercial break to the portion of the content, before recording the portion of the content). The access condition can comprise a navigation limitation (e.g., limitation on fast-forwarding, rewinding, skipping, and the like) or a copying limitation (e.g. permission to make additional copies). The access condition can comprise a limitation of access to the stored portion of the content to a specified location (e.g., home, business, state, country, region, city) or specified device (e.g., mobile device, tablet device, television).

At step 306, an acceptance of the offer can be provided. In one aspect, the acceptance can comprise a payment of the offer price. For example, the payment can be a one-time payment. In one aspect, the acceptance can comprise accessing, viewing, selecting, provided information, or otherwise interacting with an advertisement.

At step 308, an allocation of storage (e.g., an indication where the content will be stored or that the content will be stored) comprising a recording of the portion of the content can be received. For example, the allocation of storage can be limited to a storage size based on a size of the portion of the content. The allocation of storage can be located in a network device configured to provide the user access to the allocation of storage from one or more devices at one or more geographic locations. In one aspect, the allocation of storage can be received based on an estimated allocation. The estimated allocation can be based on the length of time of the portion of the content, the resolution of the content, and the like. The allocation of storage can be allocated and/or reallocated (e.g., the allocation can be expanded beyond the estimated allocation) after the portion of the content is recorded.

At step 310, access rights or related information to the recording of the portion of the content can be received by the user. In one aspect, access to the recording of the portion of the content can be received until the access condition expires. For example, when a user requests access to the recorded portion of the content, user credentials can be provided for a determination as to whether the access condition is expired or otherwise fails for the user.

At step 312, a notification can be received. The notification can comprise a notification that the recording of the portion of the content is scheduled to be deleted based on an expiration of the access condition. For example, the notification can indicate that the recording of the portion of the content is scheduled to be erased or otherwise removed from the allocation of storage. As another example, the notification can indicate that access to the allocation of storage can be temporarily or permanently terminated. In another aspect, the notification can comprise a renewal offer (e.g., notification for renewal of the offer). The renewal offer can comprise an offer to extend an expiration time, increase the number of times to access the recording of the portion of the content, extend a time period, or other similar modification to the access condition.

At step 314, a request to modify the access condition based on a renewal of the offer can be provided. The request to modify the access condition can comprise information indicating a request to extend an expiration time, increase the number of times to access the recording of the portion of the content, extend a time period, or other similar modification to the access condition. As an example, the user can renew the offer by performing an action or agreeing to perform an action, such as, accessing, viewing, selecting, providing information, or otherwise interacting with an advertisement.

Figure 4:
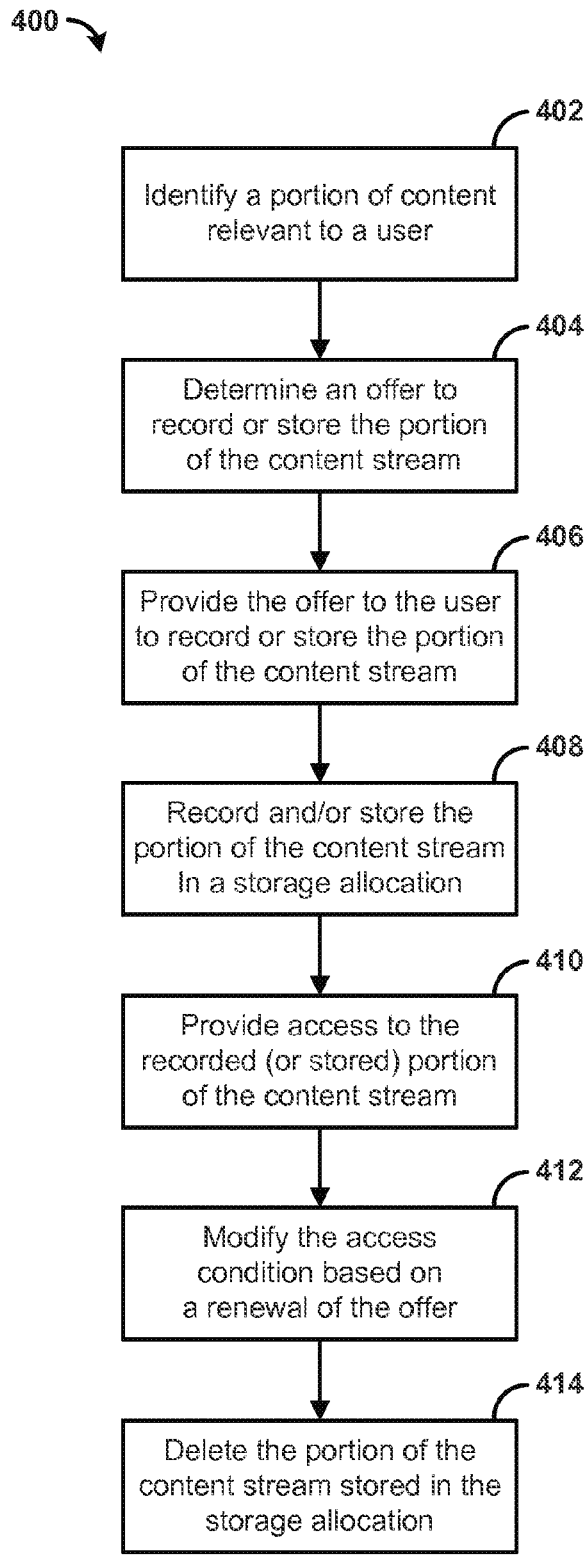
FIG. 4 is a flowchart illustrating yet another example method for providing content.

FIG. 4 is a flowchart illustrating yet another example method 400 for providing content. At step 402, a portion of content relevant to a user can be identified. The portion of content can be scheduled to be distributed at a future time. For example, the portion of content can be identified based on electronic program guide data. The portion of the content can comprise a specific content item. For example, the portion of the content can comprise at least one episode of a program, a live event, a show, a sports event, a movie, and the like. The portion of the content can be identified as relevant to a user based on a viewing history, user preferences, user location, and the like. In another aspect, the portion of the content can be identified as relevant to the user based on user input. For example, the user can indicate a preference to record the content (e.g., through a button on a remote or a button on a user interface). As a further example, the user can indicate a preference to record the portion of the content in response to a notification (e.g., popup or overlay on a user interface, email, text, and the like). In one aspect, the user can receive access to the content based on a subscription agreement. For example, the subscription agreement can comprise an agreement to provide one or more content streams based on a subscription payment. The subscription payment can be collected based on a payment schedule (e.g., by the content item, by the byte size, daily, monthly, yearly).

At step 404, an offer to record and/or store the portion of the content can be determined. The offer can comprise an offer to record and/or store the portion of the content. The offer can comprise an offer price. The offer price can be determined based on a characteristic of the portion of the content. The offer price can be based on the content resolution (e.g., standard definition, high definition), the length of the portion of the content, the channel on which the portion of the content is provided, a length of time access is provided to the portion of the content, user subscription plans, and the like. The offer price can comprise, for example, a request for a one-time payment. In one aspect, the offer can be based on an association of an advertisement with the portion of the content. For example, the offer can be conditioned upon the user accessing, viewing, selecting, providing information, and/or otherwise interacting with an advertisement. As a further example, the one-time payment can comprise an agreement to or the performance of accessing, viewing, selecting, providing information, and/or otherwise interacting with an advertisement.

In one aspect, the offer can also comprise an access condition. The access condition can comprise a time period of access to the portion of the content recorded in the storage allocation. As a further example, the access condition can comprise an expiration date, time range (e.g., X number of hours, days), a number of times the portion of the content can be accessed, and the like. In one aspect, the access condition can be based on an advertisement. For example, the access condition can be contingent upon or comprise a condition that the advertisement be accessed, viewed, selected, provided information, or otherwise interacted with during a time period (e.g., during access to the portion of the content, during a commercial break to the portion of the content, before recording the portion of the content). The access condition can comprise a navigation limitation (e.g., limitation on fast-forwarding, rewinding, skipping, and the like) or a copying limitation (e.g., permission to make additional copies). The access condition can comprise a limitation of access to the stored portion of the content to a specified location (e.g., home, business, state, country, region, city) or specified device (e.g., mobile device, tablet device, television).

At step 406, an offer to record and/or store the portion of the content can be provided to the user. For example, a request for a one-time payment can be provided. The offer can be provided to the user through email, text message, social network message, social network post, though an interface displayed with content (e.g. in an overlay, popup box, second screen interface), application notification, and the like.

At step 408, the portion of the content can be recorded and/or stored in a storage allocation. For example, one or more recording devices can record the portion of the content as one or more content streams at various bit rates. The portion of the content can be recorded in one or more digital formats. In one aspect, the recorded portion of the content can be associated with one or more identifiers configured to identify the recording, content item, content stream, content provider, requesting user, and the like.

In one aspect, the storage allocation can comprise a storage space associated with the user. The storage allocation can be limited to store the recorded portion of the content. For example, the storage allocation can be limited to a storage size based on a size of the recorded portion of the content. In one aspect, the storage allocation can be located in a network device configured to provide the user access to the storage allocation from one or more devices at one or more geographic locations. In one aspect, the storage allocation can be received and/or selected based on an estimated allocation. The estimated allocation can be based on the length of time of the portion of the content, the resolution of the content, and the like. The storage allocation can be allocated and/or reallocated (e.g., the allocation can be expanded beyond the estimated allocation) after the portion of the content is recorded.

At step 410, access to the recorded and/or stored portion of the content can be provided. In one aspect, access to the recorded and/or stored portion of the content can be provided until the access condition expires or otherwise fails for the user. For example, when a user requests access to the recorded and/or stored portion of the content, a determination can be made as to whether the access condition is expired or otherwise fails for the user.

At step 412, the access condition can be modified based on a renewal of the offer. The renewal of the offer can extend an expiration time, increase the number of times to access the recorded and/or stored portion of the content, extend a time period, or other similar modification to the access condition. In one aspect, a renewal offer can be provided, accessed, and/or received. For example, the renewal offer can extend an expiration time, increase the number of times to access the recorded portion of the content, extend a time period, or other similar modification to the access condition. In one aspect, the renewal offer can comprise an offer to permanently store the portion of the content recorded in the storage allocation. As an example, the user can renew the offer by performing an action or agreeing to perform an action, such as, accessing, viewing, selecting, providing information, or otherwise interacting with an advertisement.

At step 414, the portion of the content recorded and/or stored in the storage allocation can be deleted based on an expiration of the access condition. For example, the portion of the content recorded and/or stored in the storage allocation can be erased or otherwise removed from the storage allocation. As another example, the user's access to the storage allocation can be temporarily or permanently terminated.

Figure 5:
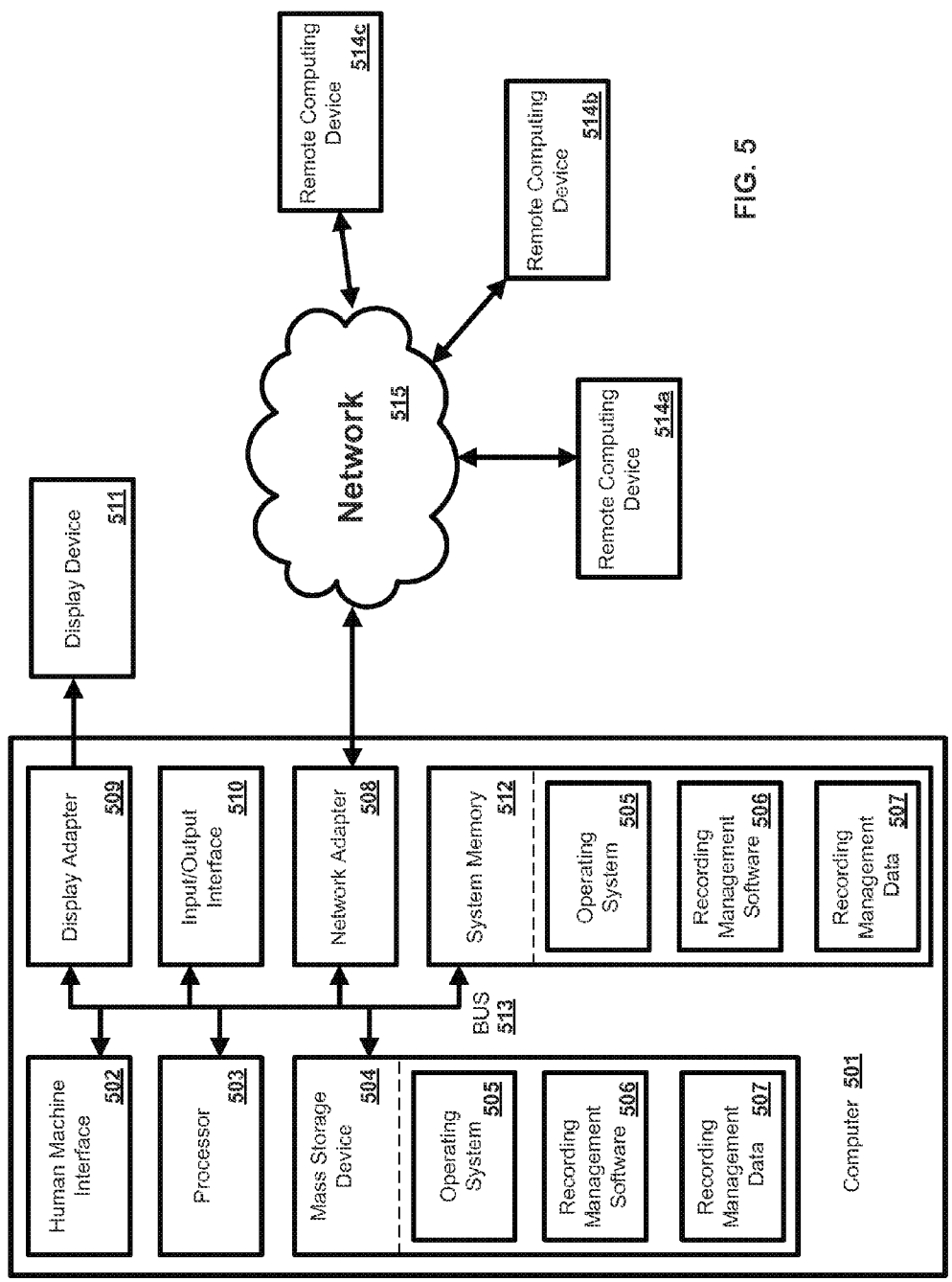
FIG. 5 is a block diagram illustrating an example computing device in which the present systems and methods can operate.

In an exemplary aspect, the methods and systems can be implemented on a computer 501 as illustrated in FIG. 5 and described below. By way of example, the first content device 102, second content device 110, and/or user device 126 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, recording management software 506, recording management data 507, a network adapter 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as recording management data 507 and/or program modules such as operating system 505 and recording management software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and recording management software 506. Each of the operating system 505 and recording management software 506 (or some combination thereof) can comprise elements of the programming and the recording management software 506. Recording management data 507 can also be stored on the mass storage device 504. Recording management data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of recording management software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   identifying first content relevant to a user;
   providing a first offer to the user to record the first content, wherein the first offer comprises a first offer price and an access condition;
   determining a first storage size at least by estimating a size of the first content based on a resolution of the first content;
   recording, by a computing device, the first content in a storage allocation, wherein the storage allocation comprises a storage space allocated to the user to store the first content, and wherein the storage space allocated to the user is limited to the first storage size;
   providing access to the stored first content in accordance with the access condition;
   receiving acceptance of a second offer, comprising a second offer price, to record second content for the user; and
   providing a third offer to upgrade to a subscription based digital video recording service having a larger allocated storage size than the first storage size based on a determination that payment of the second offer price causes an aggregate cost for recordings of the user to exceed a threshold cost.

2. The method of claim 1, wherein providing the first offer to the user to record the first content comprises providing a request for a one-time payment.

3. The method of claim 1, wherein the access condition comprises a time period of access to the stored first content in the storage allocation.

4. The method of claim 1, wherein the access condition comprises a limitation to access the first content stored in the storage allocation from a specified device.

5. The method of claim 1, further comprising determining the first offer price based on a characteristic of the first content.

6. The method of claim 1, wherein the first offer is conditioned upon the user accessing an advertisement.

7. The method of claim 1, wherein the access condition comprises a navigation limitation.

8. A system, comprising:
a non-transitory storage medium comprising computer readable instructions; and
at least one processor coupled to the non-transitory storage medium and configured, by the computer readable instructions, for:
identifying first content relevant to a user;
providing a first offer to the user to record the first content, wherein the first offer comprises a first offer price and an access condition;
determining a first storage size at least by estimating a size of the first content based on a length of time of the first content;
recording the first content in a storage allocation, wherein the storage allocation comprises a storage space allocated to the user to store the first content, wherein the storage space allocated to the user is limited to the first storage size;
providing access to the stored first content in accordance with the access condition;
receiving acceptance of a second offer, comprising a second offer price, to record second content for the user; and
providing a third offer to upgrade to a subscription based digital video recording service having a larger allocated storage size than the first storage size based on a determination that payment of the second offer price causes an aggregate cost for recordings of the user to exceed a threshold cost.

9. The system of claim 8, wherein providing the first offer to the user to record the first content comprises providing a request for a one-time payment.

10. The system of claim 8, wherein the access condition comprises a time period of access to the stored first content in the storage allocation.

11. The system of claim 8, wherein the access condition comprises a limitation to access the first content stored in the storage allocation at a specified location.

12. The system of claim 8, wherein the at least one processor is further configured for determining the first offer price based on a characteristic of the first content.

13. The system of claim 8, wherein the first offer is conditioned upon the user accessing an advertisement.

14. A method comprising:
identifying first content relevant to a user;
providing a first offer to the user to record the first content, wherein the first offer comprises a first offer price and an access condition;
determining a first storage size at least by estimating a size of the first content based on at least one of image analysis and a caption of the first content;
recording, by a computing device, the first content in a storage allocation, wherein the storage allocation comprises a storage space allocated to the user to store the first content, and wherein the storage space allocated to the user is limited to the first storage size;
providing access to the stored first content in accordance with the access condition;
receiving acceptance of a second offer, comprising a second offer price, to record second content for the user; and
providing a third offer to upgrade to a subscription based digital video recording service having a larger allocated storage size than the first storage size based on a determination that payment of the second offer price causes an aggregate cost for recordings of the user to exceed a threshold cost.

15. The method of claim 14, wherein providing the first offer to the user to record the first content comprises providing a request for a one-time payment.

16. The method of claim 14, wherein the access condition comprises a time period of access to the stored first content in the storage allocation.

17. The method of claim 14, wherein the access condition comprises a limitation to access the first content stored in the storage allocation from a specified device.

18. The method of claim 14, further comprising determining the first offer price based on a characteristic of the first content.

19. The method of claim 14, wherein the first offer is conditioned upon the user accessing an advertisement.

* * * * *